No. 668,323. Patented Feb. 19, 1901.
W. STRUTMAN.
FLY EXIT ATTACHMENT.
(Application filed June 26, 1900.)
(No Model.)
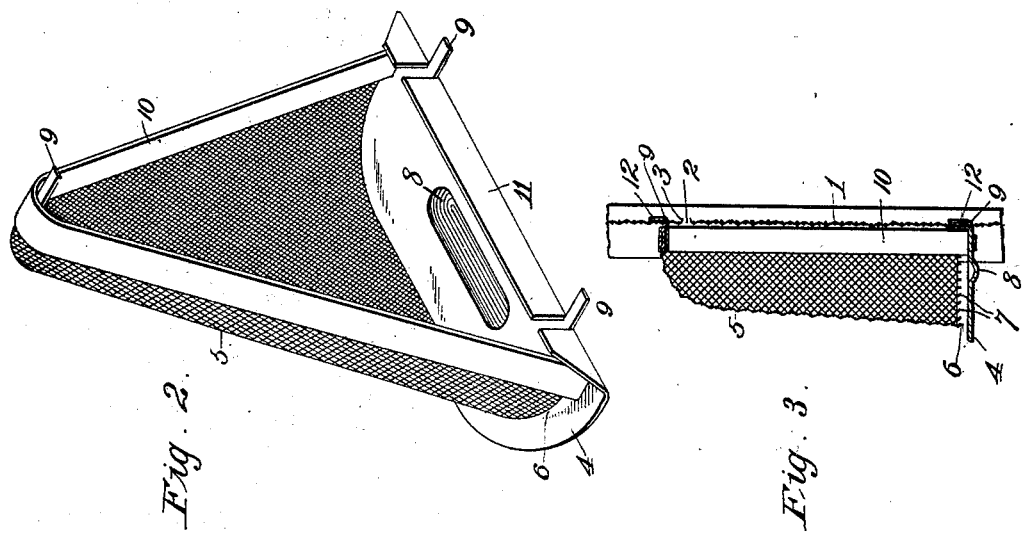
Fig. 2.
Fig. 3.
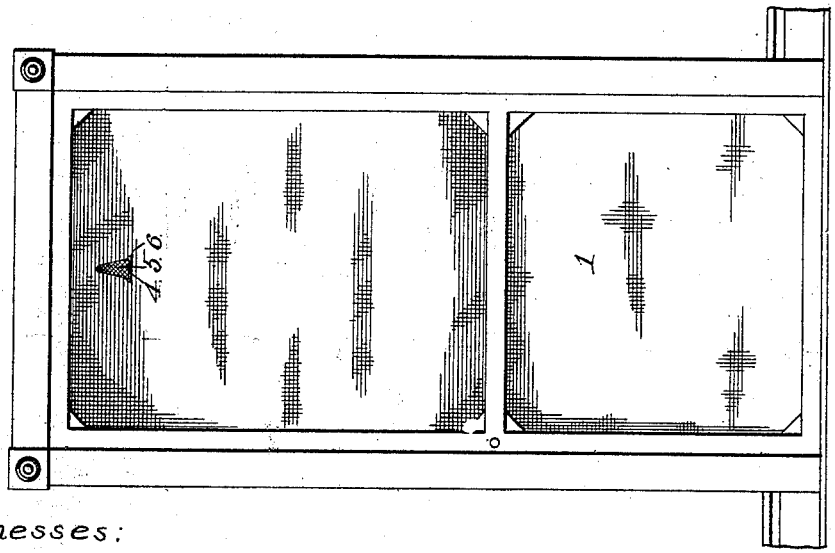
Fig. 1.
Witnesses:
H. C. Rodgers
A. H. Cooper
Inventor:
William Strutman
By Fischer & Thorpe
attys.

UNITED STATES PATENT OFFICE.

WILLIAM STRUTMAN, OF CENTROPOLIS, MISSOURI.

FLY-EXIT ATTACHMENT.

SPECIFICATION forming part of Letters Patent No. 668,323, dated February 19, 1901.

Application filed June 26, 1900. Serial No. 21,629. (No model.)

*To all whom it may concern:*

Be it known that I, WILLIAM STRUTMAN, a citizen of the United States, residing at Centropolis, Jackson county, Missouri, have invented a new and useful Fly-Exit Attachment, of which the following is a specification.

This invention relates to fly-exit attachments; and one object of the invention is to provide a device into which flies will be attracted and from which they will make their escape through an exit-opening in the screen.

A further object is to provide a device of this character of simple, cheap, durable, and ornamental appearance and which may be easily and quickly attached to or removed from the screen.

With these objects in view the invention consists in certain novel and peculiar features of construction and combinations of parts, as hereinafter described and claimed, and in order that it may be fully understood reference is to be had to the accompanying drawings, in which—

Figure 1 is an inside view of a screen-door provided with a fly-exit attachment embodying the invention. Fig. 2 is a detail perspective view of the device, full size. Fig. 3 is a central vertical section taken through the screen and the fly-exit attachment.

While this description for convenience refers to the device as a fly-exit for screens, it is to be understood, of course, that it may be used on a glass-panel door or an ordinary door and, in fact, may prove useful in other connections.

In the drawings, 1 designates an ordinary screen-door provided near its upper end with a hole 2 large enough for the passage of a fly through said hole, the same being preferably punched from the inner side of the door, so as to present the outwardly-converging jagged arms 3. The hole is formed in the upper part of the screen, because at such point the flies will naturally congregate.

The attachment comprises, essentially, a platform 4, preferably of sheet metal, and a half-cone 5, of foraminous material, preferably wire-gauze, as shown, with its lower edge arranged above the platform 4, so as to provide a space 6, through which the flies will readily crawl to enter the attachment and get at the bait, and in order to prevent the flies walking back through said entrance space or opening 6 the lower edge of the cone is preferably left raw and bent inward slightly, as shown at 7.

The bait, such as sugar, (not shown,) is placed by preference in the shallow trough 8 of the platform.

The attachment, with its apex inclosing and communicating with the inner side of exit-opening 2 of the screen, is fitted against the latter in an upright position, and while it may be secured to the screen in any other suitable or preferred manner I prefer to secure it in position by means of a plurality of metallic arms 9, projecting from the platform and from the apex of the cone, and in order to add strength and durability to the attachment the straight or flat side of the foraminous half-cone is reinforced by a strip 10, of tin or equivalent material, and the corresponding edge of the platform is provided with a stiffening-flange 11. The arms 9 are projected through openings of the screen and are then bent back against the screen, as shown at 12, to secure the attachment firmly in position.

Assuming that the attachment is in position, as shown in Fig. 1, and is baited with sugar or other saccharine substance it is obvious that the flies will be attracted by the bait and will walk inward upon the platform through the entrance opening or space 6. In its attempt to leave the fly will naturally walk upward upon the door or attachment, the form of which will guide him to the exit-opening 2, through which he will pass to the outside of the door.

It has been found that the flies do not attempt to walk back through the space or opening 6, but as a precaution the raw or ragged edge of the foraminous cone is bent inward, as described, and shown at 7, and effectually prevents them escaping through the entrance-opening. The same is true with regard to the exit-opening 2, though it has been found that the flies will walk over the exit-opening and not attempt to pass through the same.

From the above description it will be apparent that I have produced a fly-exit attachment embodying the features of advantage enumerated as desirable in the statement of invention, and while I have illustrated and described the preferred embodiment of the invention I wish it to be understood that I reserve the right to make all changes which properly fall within its spirit and scope.

Having thus described the invention, what I claim as new, and desire to secure by Letters Patent, is—

The combination with a door or analogous object provided with an exit-opening, of an attachment, comprising a sheet-metal platform having one edge perfectly straight and bearing against the door, an upwardly-projecting flange at such edge, and flexible strips projecting from said flange and secured to the door or other object, and also provided with a depression to form a bait-receiving trough, a half-cone with its upper or contracted end registering with said exit-opening, and having its outer or straight edge about in the plane of the straight or flanged edge of the platform, and the major portion of its lower edge inward of the edge and some distance above the platform to provide an entrance-opening, and provided at its apex or upper end with a metallic strip to engage the door, all arranged substantially as and for the purpose described.

In testimony whereof I affix my signature in the presence of two witnesses.

WILLIAM STRUTMAN.

Witnesses:
H. C. RODGERS,
G. Y. THORPE.